United States Patent
Vollmer et al.

(10) Patent No.: US 8,134,273 B2
(45) Date of Patent: Mar. 13, 2012

(54) ELECTRICAL MACHINE WITH SKEW-RUNNING MAGNET POLE BOUNDARIES

(75) Inventors: Rolf Vollmer, Gersfeld (DE); Marcus Ziegler, Rasdorf (DE)

(73) Assignee: Siemens Aktiengesellschaft, München (DE)

( * ) Notice: Subject to any disclaimer, the term of this patent is extended or adjusted under 35 U.S.C. 154(b) by 361 days.

(21) Appl. No.: 12/374,147

(22) PCT Filed: Jul. 18, 2007

(86) PCT No.: PCT/EP2007/057433
§ 371 (c)(1),
(2), (4) Date: Nov. 5, 2009

(87) PCT Pub. No.: WO2008/009706
PCT Pub. Date: Jan. 24, 2008

(65) Prior Publication Data
US 2010/0052466 A1 Mar. 4, 2010

(30) Foreign Application Priority Data
Jul. 20, 2006 (DE) .......................... 10 2006 033 718

(51) Int. Cl.
*H02K 1/06* (2006.01)
(52) U.S. Cl. ...... 310/216.012; 310/216.011; 310/156.47
(58) Field of Classification Search .................. 310/216, 310/1, 216.011–216.012, 156.43–156.48
See application file for complete search history.

(56) References Cited

U.S. PATENT DOCUMENTS

| | | | |
|---|---|---|---|
| 4,642,502 A * | 2/1987 | Carpenter et al. | 310/156.12 |
| 4,700,096 A * | 10/1987 | Epars | 310/153 |
| 4,906,882 A * | 3/1990 | Erndt et al. | 310/156.22 |
| 5,034,642 A | 7/1991 | Hoemann et al. | |
| 5,323,078 A | 6/1994 | Garcia | |
| 6,384,503 B1 | 5/2002 | Iwaki | |
| 6,707,209 B2 * | 3/2004 | Crapo et al. | 310/156.43 |
| 7,034,424 B2 * | 4/2006 | Kometani et al. | 310/156.47 |
| 7,196,445 B2 * | 3/2007 | Yamaguchi et al. | 310/156.47 |
| 7,348,707 B2 * | 3/2008 | Laskaris et al. | 310/216.007 |
| 7,541,710 B2 * | 6/2009 | Nemoto et al. | 310/156.47 |
| 7,898,123 B2 * | 3/2011 | Usui | 310/49.01 |
| 7,906,880 B2 * | 3/2011 | Okubo et al. | 310/156.25 |
| 7,928,622 B2 * | 4/2011 | Okubo | 310/156.47 |
| 2005/0017590 A1 | 1/2005 | Dellinger et al. | |
| 2006/0192456 A1* | 8/2006 | Yamaguchi et al. | 310/156.47 |
| 2007/0120435 A1* | 5/2007 | Laskaris et al. | 310/178 |

FOREIGN PATENT DOCUMENTS

| | | |
|---|---|---|
| DE | 199 36 361 A1 | 2/2000 |
| DE | 103 18 278 A1 | 11/2003 |
| DE | 101 47 310 B4 | 6/2004 |
| EP | 0 549 430 A1 | 6/1993 |
| EP | 1 322 027 A1 | 6/2003 |
| EP | 1 359 661 A2 | 11/2003 |
| EP | 1 501 172 A2 | 1/2005 |

(Continued)

*Primary Examiner* — Thanh Lam
(74) *Attorney, Agent, or Firm* — Henry M. Feiereisen; Ursula B. Day

(57) ABSTRACT

According to the invention, the torque ripple of electrical machines is supposed to be further reduced. For this purpose, it is provided to dispose the magnetic poles, for example, on the surface of a rotor in a plurality of sections (A1, A2) at different angles. The result are helix angles (β1, β2), which have different amounts. Also more than two different helix angles, up to a continuous course of the boundary lines (G4) between the poles, can be implemented.

8 Claims, 3 Drawing Sheets

FOREIGN PATENT DOCUMENTS

| | | |
|---|---|---|
| JP | 8298735 A | 11/1996 |
| JP | 11136893 A | 5/1999 |
| JP | 2001 251838 A | 9/2001 |
| JP | 2003/169452 A | 6/2003 |
| JP | 2003/319582 A | 11/2003 |
| JP | 2003/339129 A1 | 11/2003 |
| WO | WO 2006/032635 A1 | 3/2006 |

* cited by examiner

ELECTRICAL MACHINE WITH SKEW-RUNNING MAGNET POLE BOUNDARIES

BACKGROUND OF THE INVENTION

The present invention relates to an electrical machine having a first component (for example a rotor) and a second component (for example a stator), which is magnetically coupled to the first component and can be moved in a movement direction with respect to the second component. The electrical machine furthermore has a magnet pole arrangement on the first component, whose poles are aligned in the movement direction alternately on the one hand in a first magnetic field direction and on the other hand in a second magnetic field direction, which is opposite to the first magnetic field direction. In this case, a boundary between poles of different magnetic field directions runs corresponding to a first skew angle in a first area of the first component and corresponding to a second skew angle relative to the movement direction in a second area of the first component. The present invention relates in particular to rotating or linear electric motors.

The shape of the excitation field has a major influence on the operating behavior of an electrical machine with permanent-magnet excitation. In this case, a greater or lesser force ripple and torque ripple can always be observed. The aim is to minimize this, at the same time as maximizing the torque.

One effective means for improving the torque ripple is to skew the stator and/or rotor through, for example, one slot pitch. FIG. 1 shows a skew such as this using the example of a rotor whose outer surface is unrolled in the illustration shown in the drawing. Half the circumference πr is therefore illustrated in the vertical direction. In particular, the rotor has a length l in the axial direction. Permanent magnets or poles with different magnetic field directions or magnetization directions are arranged on the rotor surface. These magnetization directions are symbolized in FIG. 1 by N and S. Boundaries G1, which indicate the possibly continuous transition for example from a north pole N to a south pole S, run between the poles of different magnetization directions.

The rotor moves in a movement direction B with respect to the stator. The boundaries G1 run essentially transversely with respect to the movement direction B and assume an axial skew angle β with respect to the perpendicular to the movement direction. The axial skew angle leads to an arc ar over the overall length l of the rotor, where a represents the center angle and r the radius of the rotor.

Electrical machines with excitation fields which are characterized by an axial skew angle β such as this are prior art. Furthermore, electrical machines are also known with rotors in which the rotor is subdivided transversely with respect to the movement direction B, that is to say in the axial direction, into two areas A1 and A2, as is sketched schematically in FIG. 2. Furthermore, rotors are also in use which are subdivided in the axial direction into four sections A1, A2, A3 and A4, as shown in FIG. 3. The respective section length is ½ or ¼. The axial skews or boundaries G2, G3 in this case run linearly in sections. Corresponding to the example shown in FIG. 2, this results in an axial skew angle β1 in the section A1, and an axial skew angle β2 in the section A2. β1=−β2, that is to say |β1|=|β2|. In the example shown in FIG. 3, the axial skew angles also have identical magnitudes to one another. The document DE 101 47 310 B4 discloses magnets which allow discrete magnetization in a plurality of sections, as in FIG. 2 or 3.

The object of the present invention is to further reduce the force and torque ripple of an electrical machine.

According to the invention, this object is achieved by an electrical machine having a first component, a second component, which is magnetically coupled to the first component and can move in a movement direction with respect to the second component, and a magnet pole arrangement, which is formed on the first component and whose poles are aligned in the movement direction alternately on the one hand in a first magnetic field direction and on the other hand in a second magnetic field direction, which is opposite to the first magnetic field direction, wherein a boundary between poles of different magnetic field directions runs corresponding to a first skew angle in a first area of the first component and corresponding to a second skew angle relative to the movement direction in a second area of the first component, and with the first skew angle having a different magnitude than the second skew angle.

SUMMARY OF THE INVENTION

According to the invention, the torque ripple can thus be influenced in many ways by undefined functions of the skew angle. In particular, specific harmonics of the excitation field can thus be eliminated or minimized. For example, the influence of the scatter in the area of the shaft ends can be reduced by the geometry of the axial skew angle.

The first component of the electrical machine according to the invention is preferably a rotor, and its second component is a stator. In this case, the torque ripple of the motor or generator can be reduced by the design according to the invention.

Alternatively, the electrical machine may be in the form of a linear motor, with the first component being the primary part and the second component being the secondary part. In this embodiment of the electrical machine, it is possible to reduce the force ripple of the linear motor in the movement direction.

The extent of the boundary in the first area, as defined above, in the movement direction is, according to one specific refinement of the electrical machine, equal to the extent of the boundary in the second area (for example one slot pitch). The extent of the boundary in the first area may, however, also be greater than in the second area. One variant or the other is advantageous, depending on the application.

Corresponding to a further preferred embodiment, the boundary between the differently directed poles runs with three different skew angles in three sections. This makes it possible to take account of widely differing asymmetric influences on the torque ripple.

It is also advantageous for the profile of the boundary to be point-symmetrical or axially symmetrical essentially transversely with respect to the movement direction. This makes it possible, for example, to reduce or avoid axial forces in a rotor.

In one specific embodiment, the boundary between the differently directed poles may run essentially sinusoidally. The continuous profile of the boundary likewise has a positive influence on the torque ripple or force ripple.

The profile of the boundary may, however, also be quantized. This means that the skew angle is modeled by appropriate arrangement of rectangular magnet elements. In this case, the boundary runs with discontinuities along the movement direction and/or transversely with respect to it.

BRIEF DESCRIPTION OF THE DRAWING

The present invention will be explained in more detail with reference to the attached drawings, in which.

DETAILED DESCRIPTION OF PREFERRED EMBODIMENTS

The exemplary embodiments which are described in more detail in the following text represent preferred embodiments of the present invention.

Figure 1:
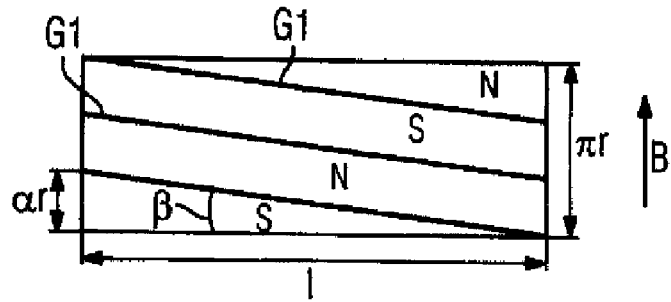
FIG. 1 shows an unrolled half of a rotor with differently directed magnet poles and a single skew angle according to the prior art.
Figure 2:
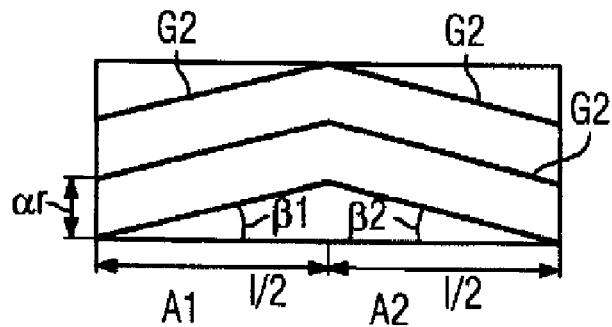
FIG. 2 shows a magnet pole arrangement with two sections with skew angles of the same magnitude, according to the prior art.
Figure 3:
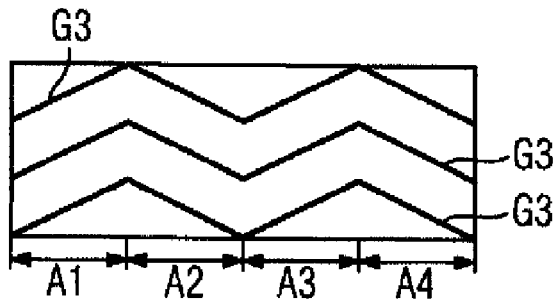
FIG. 3 shows a magnet pole arrangement with four sections according to the prior art.
Figure 4:
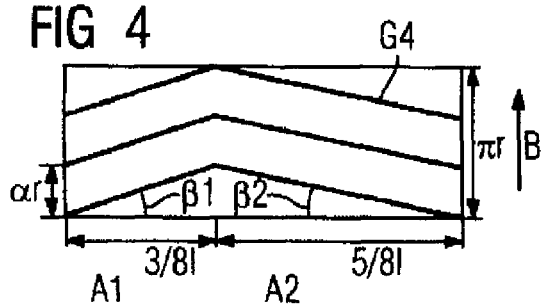
FIG. 4 shows a magnet pole arrangement according to the invention, with two skew angles of different magnitudes.

Building on the fundamental idea according to the invention of using at least two different axial skew angles, FIG. 4 shows a first exemplary embodiment of the present invention. As in the previous FIGS. 1 to 3, FIG. 4 also illustrates half the surface of a rotor, unrolled. The axis of the rotor is located in the horizontal direction in the illustration, while the movement direction B once again runs in the vertical direction. The electrical machine may, of course, also move in the opposite direction. The movement direction B is used here only for definition and description of the angles and variables that are used.

In this case, the rotor is subdivided into two sections A1 and A2. The first section A1 has a length of $3/8$ l, and the second section has a length of $5/8$ l. The ratio of the section widths and lengths is therefore $3/5$ in this case. This ratio may also be chosen differently, as required. For example, a ratio of 2/1 or 1/1 is particularly advantageous.

The skew angle in the first section A1 is $\beta 1$, and the skew angle in the second section A2 is $\beta 2$. The angles have a different magnitude and a different mathematical sign. The skews, that is to say the boundaries G4 between the different poles, run continuously in the direction of the longitudinal axis of the rotor, without any discontinuities. They are located at a distance a×r.

Figure 5:
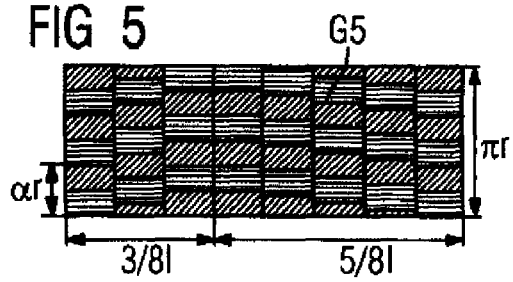
FIG. 5 shows the example from FIG. 4 with quantized skew.

In the exemplary embodiment in FIG. 5, the permanent magnets are in the form of small magnet elements. The placing of the individual magnets on the rotor surface leads to a magnet pole arrangement which corresponds essentially to the magnet pole arrangement shown in FIG. 4. One pole of each magnet element points upwards on the rotor surface. The different poles are indicated by different shading in FIG. 5.

The boundaries G5 between the differently directed permanent magnets or poles in this case run in a stepped form. If the boundary G5 is linearized, this results in exactly the same profile as that of the boundary G4 in FIG. 4. The continuous profile of the boundary G4 can be achieved, for example, by spraying a plastic-bonded magnetic material onto the rotor, and appropriate magnetization. Alternatively, expensive, premagnetized permanent magnets, manufactured with a skew, can also be used for the continuous profile of the boundary G4.

Figure 6:
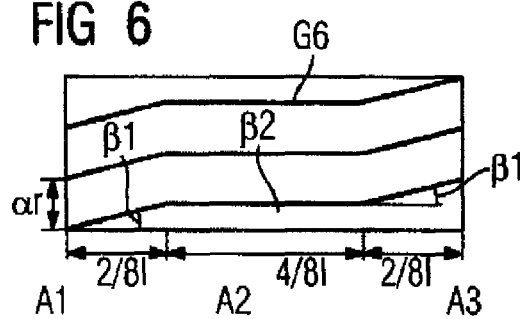
FIG. 6 shows a magnet pole arrangement with three sections and two different skew angles.

FIG. 6 shows a third exemplary embodiment of the present invention where the rotor surface is subdivided axially into three sections A1, A2 and A3. The two outer sections A1 and A3 have a width of $2/8$ l, and the center section A2 correspondingly has a width of $4/8$ l. In the two sections A1 and A3, the axial skew angle is $\beta 1$, while it is $\beta 2$ in the central section A2. In the example in FIG. 6, $\beta 2=0$. The distance between two boundary lines G5 is in this case likewise ar. The arc which is covered by a single boundary line G5 in the circumferential direction is likewise ar in the chosen example.

Figure 7:
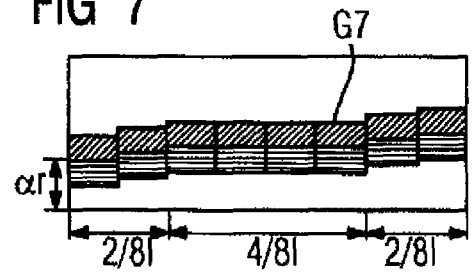
FIG. 7 shows the example from FIG. 6 with quantized skew.

The fourth exemplary embodiment, which is sketched in FIG. 7, once again represents the quantized form of the exemplary embodiment shown in FIG. 6. In this case, when it is linearized, the boundary G7 runs exactly in the same way as the boundary G6 in FIG. 6.

Figure 8:
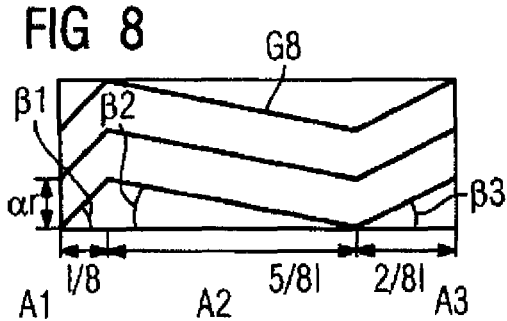
FIG. 8 shows a magnet pole arrangement with three sections and three different skew angles.

A fifth exemplary embodiment for three different axial skew angles $\beta 1$, $\beta 2$ and $\beta 3$ is illustrated in FIG. 8. In this case, the skew angle $\beta 1$ is in a first section A1 having the width $1/8$, the skew angle $\beta 2$ is in a second section A2 having the length $5/8$ l, and the skew angle $\beta 3$ is in a third section A3 having the length $2/8$ l. All three skew angles $\beta 1$, $\beta 2$ and $\beta 3$ are sufficiently large that the boundary G8 covers the arc ar in the respective section.

Figure 9:
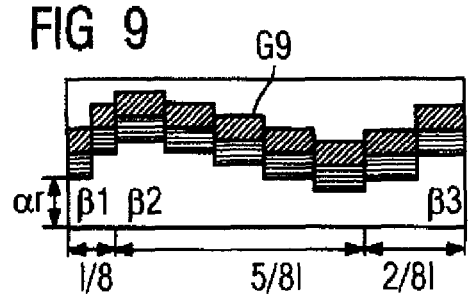
FIG. 9 shows the example from FIG. 8 with quantized skew.

The sixth exemplary embodiment, as shown in FIG. 9, represents a quantized form of the fifth exemplary embodiment from FIG. 8. In the case of linearization, the boundary G9 has the same profile as the boundary G8.

Figure 10:
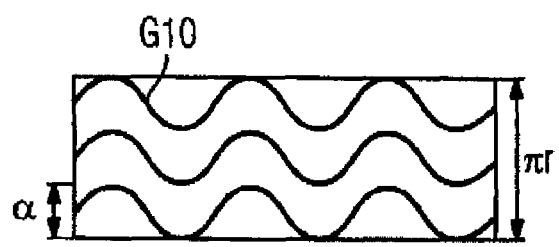
FIG. 10 shows a magnet pole arrangement with a sinusoidal profile of the pole boundaries.

A seventh exemplary embodiment, which is illustrated in FIG. 10, relates to sinusoidal magnetization. In this case, there are a virtually infinite number of axial skew angles, resulting from the sinusoidal function. The boundary G10 between the differently directed poles in this case has a number of periods in the axial direction of the rotor. However, for example, it may also have just one period or a fraction of one period. The boundary G10 may, in addition to the sinusoidal profile, also have a profile which can be described by a different function and which changes continuously, and can be differentiated continuously.

Figure 11:
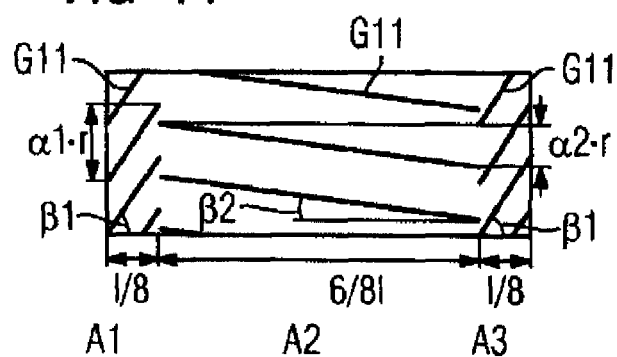
FIG. 11 shows a magnet pole arrangement with pole boundaries which are not continuous.

An eighth exemplary embodiment is sketched in FIG. 11 where two different axial skew angles $\beta 1$ and $\beta 2$ are provided in the sections A1, A2 and A3. The central section has a gradient with a relatively small magnitude, that is to say a relatively small axial skew angle $\beta 2$, in comparison to the axial skew angles $\beta 1$ in the two sections A1 and A3. This means that the boundaries G11 in this case have the same gradient in the two edge sections A1 and A3. In this case, the boundaries G11 do not run continuously but have discontinuities at the section boundaries. In the sections A1 and A3, the section of the boundary G11 covers an arc a1×r. In contrast, the part of the boundary G11 in the section A2 covers the arc a2×r. The arc a2×r is smaller than the first arc a1×r. This variant is used in particular to compensate for the influence of the end winding scatter on the torque ripple.

Figure 12:
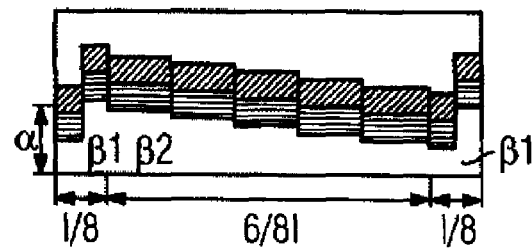
FIG. 12 shows the example from FIG. 11 with quantized skew.

The ninth embodiment, which is illustrated in FIG. 12, corresponds to a quantized implementation variant of the magnet arrangement in FIG. 11.

What is claimed is:

1. An electrical machine, comprising:
   a first component;
   a second component, which is magnetically coupled to the first component and movable in a movement direction with respect to the second component; and
   a magnet pole arrangement, which is formed on the first component and has poles which are aligned in the movement direction and alternate in a first magnetic field direction and in a second magnetic field direction, which is opposite to the first magnetic field direction, wherein a boundary between poles of different magnetic field directions runs corresponding to a first skew angle in a first area of the first component and corresponding to a second skew angle relative to the movement direction in a second area of the first component, wherein the first skew angle has a different magnitude than the second skew angle, and wherein the boundary runs at three different skew angles.

2. The electrical machine of claim 1, wherein the first component is a rotor and the second component is a stator.

3. The electrical machine of claim 1, constructed in the form of a linear motor having a primary part represented by the first component and a secondary part represented by the second component.

4. The electrical machine of claim 1, wherein an extent of the boundary in the first area in the movement direction is equal to an extent of the boundary in the second area.

5. The electrical machine of claim 1, wherein an extent of the boundary in the first area in the movement direction is greater than an extent of the boundary in the second area.

6. The electrical machine of claim 1, wherein the boundary has a profile which is essentially centro-symmetrical transversely with respect to the movement direction.

7. The electrical machine of claim 1, wherein the boundary runs essentially sinusoidally.

8. The electrical machine of claim 1, wherein the boundary has a profile which is quantized.

* * * * *